June 21, 1960     D. BROWN ET AL     2,941,873
PREPARATION OF SULFUR
Filed July 1, 1955
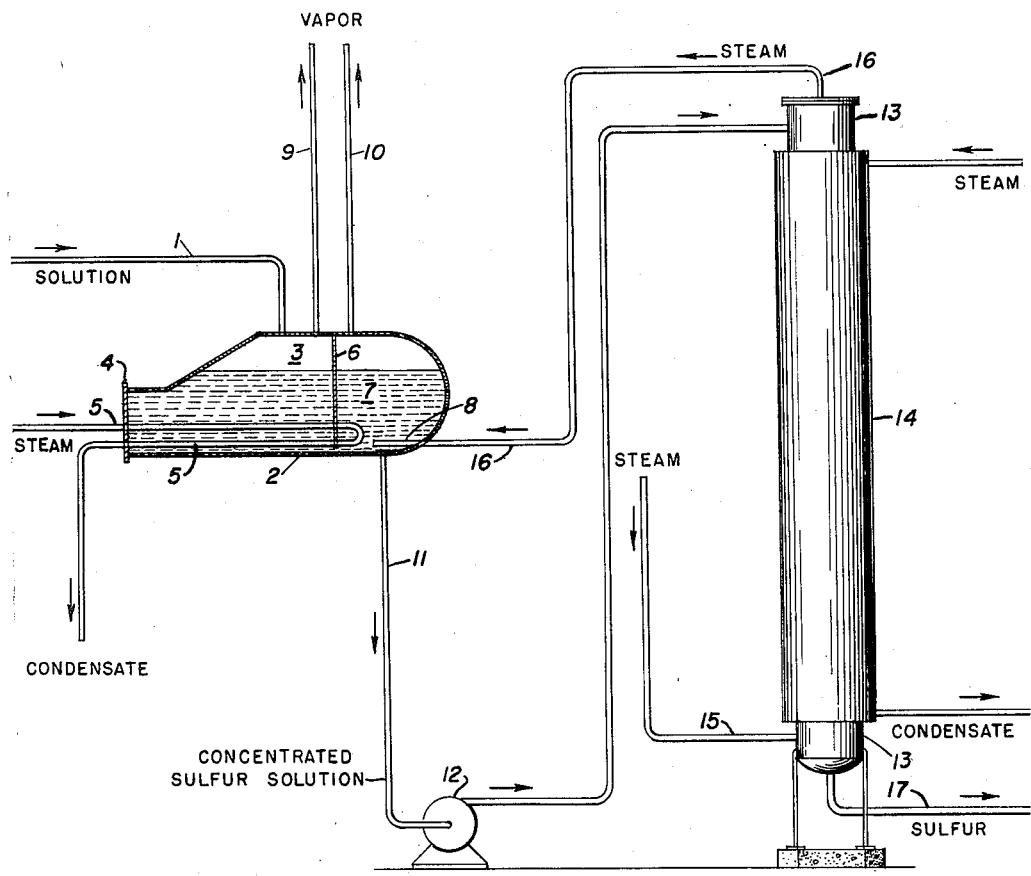
INVENTORS
DAVID BROWN
JOHN W. COLTON
By Frank Makara
Attorney United States Patent Office 2,941,873
Patented June 21, 1960

2,941,873

PREPARATION OF SULFUR

David Brown and John W. Colton, New York, N.Y., assignors, by mesne assignments, to Scientific Design Company, Inc., a corporation of Delaware Filed July 1, 1955, Ser. No. 519,518

1 Claim. (Cl. 23—274)

This invention relates to a method and apparatus for preparing sulfur from a solution of sulfur in carbon disulfide.

In prior procedures for obtaining sulfur from solutions thereof in carbon disulfide, the problem of sulfur precipitation upon concentrating the sulfur solution was encountered. Thus at atmospheric pressure a 60 to 65 percent sulfur solution in carbon disulfide would show sulfur precipitation.

It is an objective of this invention to concentrate a solution of sulfur in carbon disulfide without effecting sulfur precipitation.

It is another objective to volatilize completely the carbon disulfide from a sulfur solution thereof, to produce substantially pure sulfur.

It is a further objective to provide an economical and convenient method of producing bulk sulfur of high purity.

It is another objective to produce the bulk sulfur in block form.

These and other objectives of this invention will become readily apparent upon reading the following descriptive disclosure taken in conjunction with the drawing.

According to this invention, the carbon disulfide is evaporated from a sulfur solution thereof under critical conditions of pressure and temperature to avoid precipitation of sulfur during the concentrating of the sulfur solution to obtain sulfur substantially free from carbon disulfide.

According also to this invention, it was discovered that if the evaporation of carbon disulfide from a boiling sulfur solution thereof was effected at 1100 mm. of mercury pressure or greater than the product contained 96 percent sulfur and that at no time during the concentration was sulfur precipitated.

Moreover, the higher the boiling temperatures employed, the lower became the residual amount of carbon disulfide in the final product.

However, the higher temperatures, for example 159° C., produce high viscous solutions, thereby interfering with the process of heat transfer from the steam coils used in the heating of the solution.

Preferably a temperature of 130–140° C. is desirable and the pressure preferably used is from 1100 to 1500 mm. mercury though pressures of 2,000 to 3,000 mm. Hg are operable.

The sulfur solution resulting is a hot liquid of 96 percent sulfur purity, however this small amount of carbon disulfide may be removed if desired, by a steam sparging procedure to produce a sulfur having substantially 99.6 percent purity, which may be steam stripped to obtain 100% sulfur purity.

Several embodiments of this invention are possible some of which are given below. Thus, the simplest illustrative embodiment is the evaporation of carbon disulfide from a sulfur solution thereof in an autoclave at super-atmospheric pressure, said autoclave being provided with an outlet opening between the vapor space in said autoclave and a condenser coil for condensing the carbon disulfide evaporated under said super-atmospheric pressure.

Another embodiment of this invention consists of evaporating the carbon disulfide from two communicating vessels having a conduit for the continuous flow of the sulfur solution therebetween. In this embodiment (not shown) both autoclaves or pressure resistant vessels are each provided with preferably equal super-atmospheric pressure upon the surface of the sulfur solution. Clearly as the carbon disulfide is evaporated from the solution in the first vessel, it becomes more concentrated in sulfur and its boiling point rises. As a result, the solution going into the second vessel through the common conduit therebetween has a higher boiling point and is more concentrated in sulfur content. Further, carbon disulfide evaporation is effected in said second autoclave vessel to obtain a sulfur solution of a desired purity of for example 96 percent. Clearly, three or more communicating vessels in series relationship may be used in lieu of two interconnected vessels if desired.

However, to effect economy of apparatus and space a common autoclave may be employed having one or more depending baffles therein thereby separating the liquid in the autoclave vessel into two or more compartments interconnected in fluid communicating relationship at the bottom of the baffle, the baffles being suspended in the single autoclave in such a manner as to leave a free space therebeneath. In other words, the bottom edge of the respective baffles are disposed in spaced relationship to the bottom inside surface of the autoclave. In effect, the autoclave is thereby divided into two interconnecting autoclaves, the baffle plate functioning as a pipe conduit therebetween.

For purposes of simplicity, the drawing herein shows an autoclave having a baffle plate therein thereby dividing the original autoclave space into two autoclave chambers interconnected below the baffle. Clearly three depending baffles would separate the original autoclave space into four autoclave chambers interconnected in series below the baffles.

In this invention, the sulfur as obtained from the evaporation of carbon disulfide under super-atmospheric pressure, being of 96 percent sulfur content, is sufficiently pure for many uses.

Referring to the drawing, a solution of for example 25 percent sulfur dissolved in carbon disulfide is introduced through conduit 1 into a longitudinal autoclave 2 into the forward compartment 3 thereof. The autoclave 2 is horizontally disposed and provided with a head plate 4 through which a steam coil conduit 5 is introduced.

The horizontal chamber of the autoclave which is preferably operated at a pressure of 1100 or 1150 mm. Hg as a minimum is divided by a depending baffle plate 6 into a forward compartment 3 and a rear compartment 7 interconnected beneath the baffle 6.

As shown in the drawing the steam coil conduit 5 is disposed adjacent the bottom of compartment 3 and extends into compartment 7 whereupon its direction is reversed back toward head plate 4.

An outlet conduit 9 for carbon disulfide vapor is attached to the top wall of autoclave 2 communicating with the vapor space of compartment 3 thereof. Also a vapor outlet 10 is attached to the top wall of autoclave 2 communicating with compartment 7 thereof.

The temperature of the sulfur solution in compartment 3 is preferably about 70° C. whereas in compartment 7 the temperature is preferably about 130° C.

The concentrated sulfur solution under pressure in the autoclave is conducted from compartment 7 into liquid outlet conduit 11 and contains about 4 percent carbon disulfide. To effect the required super-atmospheric pressure in the autoclave a conventional throttle valve (not shown) may be secured to the vapor outlet conduits 9 and 10.

The apparatus and process as described above produces a sulfur of about 96 percent purity and constitute a complete apparatus and complete process.

However, optionally this sulfur may be brought to 99.6 percent purity. To obtain such purity the hot sulfur solution in the last compartment of the autoclave relative to the inlet conduit 1 is treated with live steam in conduit 8 of suitable pressure and temperature obtained from any suitable source.

However, as shown in the drawing, in this modification the liquid sulfur of about 99.6 percent purity and containing but about 0.4 percent carbon disulfide is pumped by centrifugal pump 12 into the top of a tall vertically disposed stripper column 13. A conventional steam jacket 14 is disposed about column 13 thereby preventing undue cooling of the stripper column.

Live steam is introduced into the base of the stripper 13 through steam conduit 15, while the hot sulfur liquid containing but about 0.4 percent carbon disulfide is introduced at a point adjacent the top of the stripper 13.

The live steam containing the stripped carbon disulfide issues from the top of stripper 13 through conduit 16 and is conducted into conduit 8 disposed in the base of compartment 7 of the autoclave 2.

The operation of this process is preferably continuous and by way of an illustrative example, a solution of 25 pounds of sulfur in 75 pounds of carbon disulfide is introduced into compartment 3 of autoclave 2 through conduit 1. The pressure maintained in the autoclave was 1200 mm. Hg. Steam was conducted into the autoclave through conduit 5 to effect a temperature of about 70° C.

The temperature of the liquid sulfur solution in compartment 7 was about 130° C. The use of the baffle 6 in effect cuts that area of steam coil conduit 5 used for heat transfer in the autoclave to about one-fourth of that area had no baffle 6 been used.

During operation of the apparatus the pressure in compartments 3 and 7 are the same or substantially equal. The vapor issuing from outlet 9 consists of 69.9 pounds of carbon disulfide whereas that from outlet 10 consists of 5.1 pounds carbon disulfide and 10 pounds of water vapor.

In this embodiment, live steam consisting of 10 pounds water and having 0.1 pound carbon disulfide coming from stripper 13 is conducted into sparge conduit 8. This live steam from conduit 16 reduces the partial pressure of the carbon disulfide in the vapor over the liquid to about one-tenth of the pressure had no live steam been used. The steam jacket 14 prevents loss of heat from the live steam in the stripper. The sulfur pumped by pump 12 consists in this example of 25 pounds of sulfur having 0.1 pound carbon disulfide therein. The amount of live steam used in the stripper is 10 pounds, the stripper temperature being maintained at 130° C. though temperatures of 120° C. to 150° C. are operable therein, while the stripper pressure employed is preferably about 1800 mm. Hg.

The ultimate product obtained from the bottom of the stripper 13 through conduit 17 is substantially pure sulfur, having substantially a 100 percent sulfur content.

Preferably this liquid sulfur is poured into molds to form slabs of about 3,000 pounds. The use of huge slabs of about 1 foot thickness and about 4 feet wide by 6 feet long is a great convenience. Among the advantages for slab use is the ease of keeping an inventory of the stock on hand, lack of sulfur dust and fines, and the lack of dirt contamination due to storage.

This invention has been illustratively described but it is not to be limited to the illustrations. Thus a range of temperature from 60 to 100° C. is operable in the forward compartment 3 of the autoclave 2 whereas the temperature of the rear compartment is maintained at between 110 to 150° C. by the live steam from conduit 5. However, a preferred temperature range of 70 to 80° C. is maintained in the forward compartment 3 because with these temperatures optimum heat transfer from steam conduit 5 is obtained.

Having now disclosed the invention, other obvious modifications will now readily occur to those skilled in the art, but all these obvious modifications fall within the scope of this invention and are intended to be embraced within the claim herein.

We claim:

An apparatus for concentrating solutions comprising an autoclave, a depending baffle disposed in said autoclave dividing said autoclave into two compartments interconnected below said baffle, said autoclave having an opening in each compartment for removal of vapor and further having an opening in said first compartment for introducing therein liquid solution to be concentrated, conduit means disposed interiorly and adjacent to the bottom autoclave wall for heating the solution communicably disposed in both interconnected autoclave compartments, pump means for removal of said concentrated solution, a steam stripper for stripping said concentrated solution of volatiles therein and wherein said means for introducing live steam into said second compartment is secured to said steam stripper whereby the stripper steam is introduced into said second compartment.

References Cited in the file of this patent

UNITED STATES PATENTS

| | | |
|---|---|---|
| 166,279 | Johnson | Aug. 3, 1875 |
| 1,285,358 | Perry | Nov. 19, 1918 |
| 1,408,467 | Perry et al. | Mar. 7, 1922 |
| 1,454,344 | Stewart | May 8, 1923 |
| 1,533,213 | Schwab | Apr. 11, 1925 |
| 1,599,363 | Jannek | Sept. 7, 1926 |
| 2,088,190 | Du Pont | July 27, 1937 |
| 2,140,070 | Bransky | Dec. 13, 1938 |
| 2,155,633 | Bachi | Apr. 25, 1939 |
| 2,249,192 | Titlestad et al. | July 15, 1941 |
| 2,419,310 | Belchetz | Apr. 22, 1942 |
| 2,798,034 | Egbert et al. | July 2, 1957 |